United States Patent [19]

Lederman

[11] Patent Number: 4,874,069
[45] Date of Patent: Oct. 17, 1989

[54] ROLLER CLUTCH WITH IMPROVED LUBRICATION

[75] Inventor: Frederick E. Lederman, Sandusky, Ohio

[73] Assignee: General Motors Corporation, Detroit, Mich.

[21] Appl. No.: 238,788

[22] Filed: Aug. 31, 1988

[51] Int. Cl.$^4$ .............................................. F16D 15/00
[52] U.S. Cl. .................................. 192/45; 192/113 B; 384/465
[58] Field of Search ...................... 142/45, 113 B, 45.1, 142/41 R; 384/465, 470, 472, 474

[56] References Cited

U.S. PATENT DOCUMENTS

| | | | |
|---|---|---|---|
| 2,292,988 | 8/1942 | Bloomfield et al. | 192/45 |
| 2,755,899 | 7/1956 | Erickson | 192/45 |
| 2,998,113 | 8/1961 | Marland | 192/45 |
| 4,782,931 | 11/1988 | Lederman | 192/70.12 |

Primary Examiner—Leslie A. Braun
Assistant Examiner—Andrea Pitts
Attorney, Agent, or Firm—Patrick M. Griffin

[57] ABSTRACT

Lubrication for a roller clutch cage of the type that is installed to a cam race that is in turn secured tightly to a mounting drum is improved by providing an internal oil passage in the cage that is open on one side. When the cam race is secured to the drum, the open passage is closed off against a face of the drum, providing a secondary closed oil path that connects to the primary oil path already formed between the cam race and the drum face. Therefore, pressurized oil can be provided all the way though the cage, directly to the bearing surface of the cage.

3 Claims, 3 Drawing Sheets

ROLLER CLUTCH WITH IMPROVED LUBRICATION

This invention relates to roller clutches in general, and specifically to a roller clutch that provides improved lubrication between a bearing surface on the cage and the pathway.

BACKGROUND OF THE INVENTION

Modern automatic transmissions generally include several overrunning roller clutches. The roller clutches are each installed between a cam race and a pathway race, and each race is in turn joined to one part of a selective torque transfer mechanism. The interposition of the roller clutch between the two parts of the torque transfer mechanism acts to improve the timing and quality of shift as the gears change ratio. In modern roller clutches, known as concentricity control clutches, the clutch cage also includes a series of bearing surfaces that ride on a cylindrical surface of the pathway race, known as the the pathway, thereby keeping the races basically coaxial to one another. The cage is typically molded of nylon or some other suitable material, and may be molded in one piece. The cage is installed to the cam race before the pathway race is added, and does not move or turn relative to the cam race as the clutch operates. However, the pathway rides over the cage bearing surfaces very rapidly as the clutch overruns, and it is desirable, especially in high speed clutches, to provide a film of lubricant between the pathway and the cage bearing surfaces to reduce friction and wear.

A known means of supplying lubricant to the pathway-cage bearing surface interface may be seen in the first three Figures of the drawings, in which.

Figure 1:
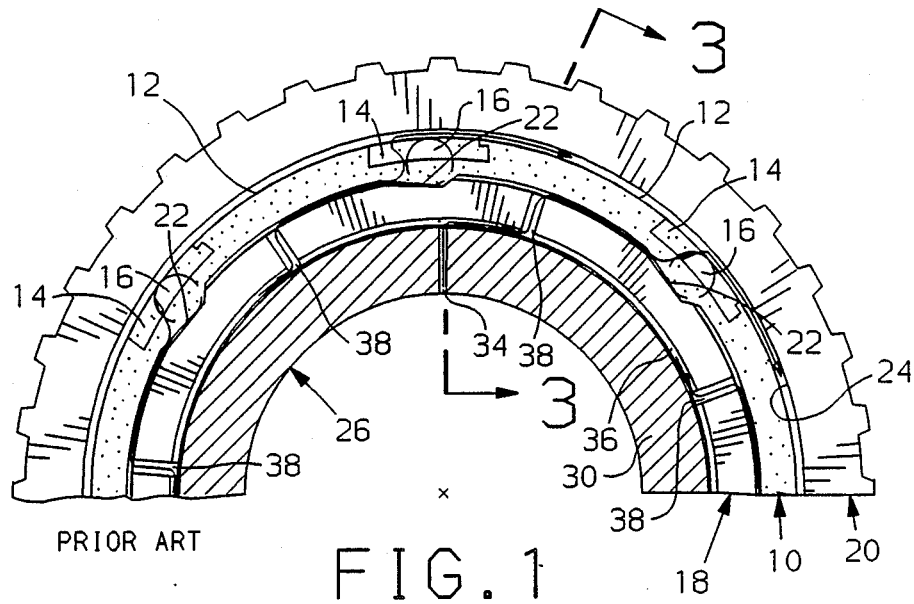
FIG. 1 is a sectional view of a mounting drum of a transmission, clutch races and clutch taken along the line 1—1 of FIG. 3.
Figure 3:
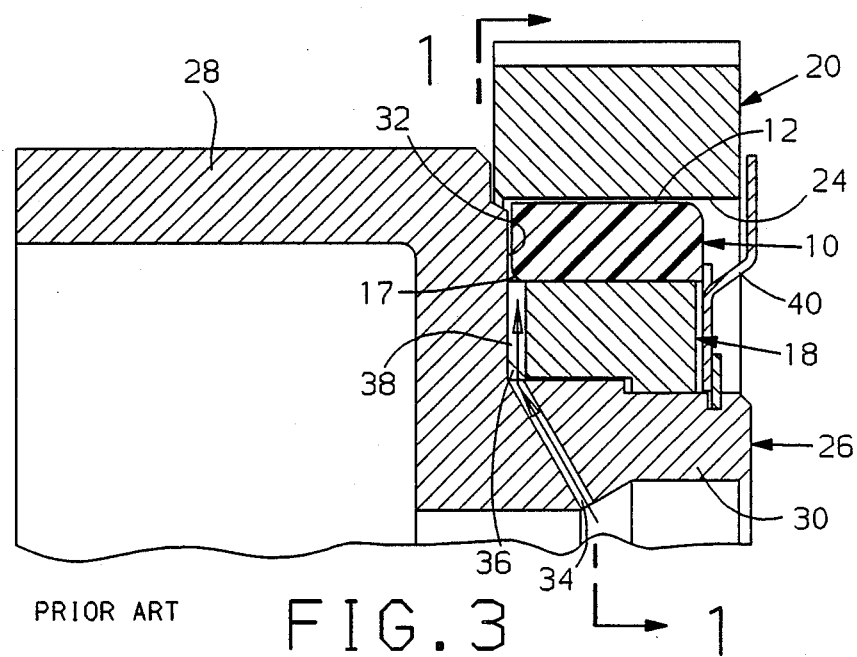
FIG. 3 is a sectional view taken along the line 3—3 of FIG. 1.

Referring to FIGS. 1 and 3, a conventional roller clutch cage is indicated generally at 10, which has several typical features. Cage 10 is integrally molded of nylon or other suitably tough plastic with a spaced series of partially cylindrical bearing surfaces 12 on its outer periphery. Between adjacent surfaces 12, a like number of open roller pockets 14 each contains a spring energized roller 16. The innermost edge on the inner face of cage 10 is rounded at 17, for a purpose described below. Cage 10 fits closely between an inner cam race, indicated generally at 18, and an outer pathway race, indicated generally at 20. Cam race 18 has the usual series of spaced cam ramps 22, and cage 10 is fixed to the cam race 18 by fitting it onto the cam ramps 22 by the usual push and twist method. After installation, therefore, cage 10 does not turn relative to cam race 18. The cam race 18 forms an annular space with a cylindrical surface, or pathway, 24 of pathway race 20. As the races 18 and 20 overrun, pathway 24 is maintained coaxial to cam race 18 by riding over the cage bearing surfaces 12. Cam race 18 also has other features intended to cooperate with other structure that is part of the automatic transmission environment, which is described first.

Figure 2:
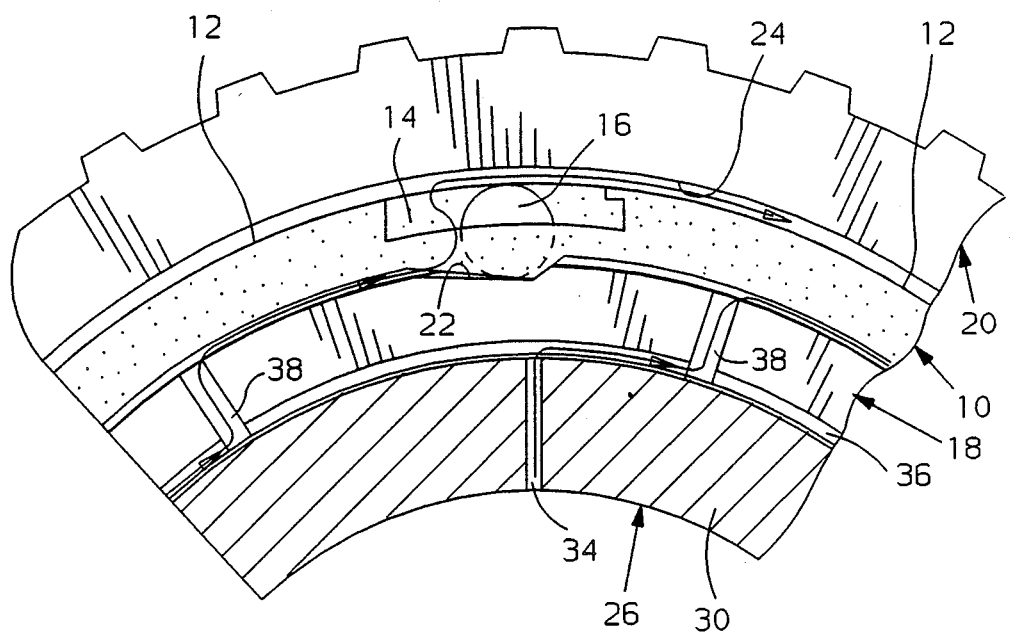
FIG. 2 is an enlargement of a portion of FIG. 1.

Still referring to FIGS. 1 through 3, a mounting structure, in this case a drum indicated generally at 26, has the form of a stepped cylinder with a generally L shaped cross section. Drum 26 has a larger diameter sleeve 28, a coaxial smaller diameter sleeve 30, and a flat face 32 that is perpendicular to the axis of drum 26. Several oil holes 34 drilled through the smaller sleeve 30 open right at the intersection of smaller sleeve 30 and face 32. Drum 26 is part of a selective torque transfer mechanism within the transmission, which would also include a stack of piston activated friction disks splined to the inside of smaller sleeve 30, a similar stack splined to the outside of pathway race 20, and a band applied to the outside of sleeve 30, none of which need be illustrated to explain the invention. As the drum 26 and pathway race 20 are selectively powered or held, the roller clutch serves the speed matching, shift smoothing function described above. It should be understood that, in the specific environment involved here, the drum 26 will have a significant absolute speed during clutch overrun, and the pathway race 20 may, as well.

Still referring to FIGS. 1 and 3, the inner face of cam race 18 has a chamfer 36 along its entire inner edge, and a plurality of spaced radial grooves 38 cut across the inner face and into chamfer 36. Chamfer 36 and groves 38 coact with drum face 32 after the cam race 18 has been secured to drum 26 as follows. First, cam race 18 is secured to drum 26 by pushing it tightly over the outer surface of smaller sleeve 30, until the inner face of cam race 18 abuts with the mounting drum face 32. The oil holes 34 are assured of opening into chamfer 36, since chamfer 36 covers 360 degrees. The closed passage formed between the chamfer 36, grooves 38 and the drum face 32, together with the oil holes 34 that open into chamfer 36, comprise a closed and pressurized oil path that ends at the radially outer edge of cam race 18. Then, cage 10 is fitted onto the cam ramps 22 as described above. Next, the pathway race 20 is pushed in over rollers 16 and twisted into place. Finally, a snap ring 40 is fixed to the drum's smaller sleeve 30. Snap ring 40 serves only to prevent cage 10 and pathway race 20 from moving too far away from drum face 32, since cam race 18 is held to smaller sleeve 30 completely by a friction fit. Cage 10 and pathway race 20 are not tightly confined between snap ring 40 and drum face, as is indicated by the clearance shown between the inner faces of cage 10, pathway race 20, and drum face 32.

Referring next to FIG. 2, during the operation of the transmission, lubricating oil is continually pumped under pressure through the oil holes 34 by a transmission pump that is not illustrated. Oil leaves the oil holes 34, still under pressure, and enters the area between the chamfer 36 and drum race 32. Oil can flow in either direction as it enters the area between chamfer 36 and drum face 32, but the arrows indicate only the flow clockwise, for simplicity. Next, pressurized oil enters the area between the grooves 38 and the drum face 32, flowing radially out. The oil remains under pressure only until it leaves the radial grooves 38 at the radially outer edge of cam race 18, which is where the closed path described above ends. At that point, the oil loses pressurization, and the centrifugal force of the rapidly counterclockwise rotating drum 26 will then throw much of the oil radially out through the clearance between the inner face of cage 10 and the drum face 32. The oil that escapes is effectively lost for purposes of lubricating the cage bearing surfaces 12, and its flow path is not indicated by arrows. At least some of the oil, however, will splash out in both directions along the channel formed between the cage rounded edge 17 and the drum face 32. Again, for simplicity, only the clockwise flow in that channel is shown. Some of that oil will eventually reach the open pockets 14. The pockets 14 represent an available path for oil to be thrown radially outwardly and into the pathway 24. Although pathway 24 may or may not be rotating rapidly in the absolute sense during clutch overrun, it will be rotating rapidly relative to the oil that comes into contact with it through the pockets 14. That oil is then sheared or pulled into the interface between the adjacent bearing surface 12 and the pathway 24, its target area. As the arrows indicate, oil flow to the target area is far from direct. Given the convoluted path, the fact that the oil loses pressure when it leaves the grooves 38, as well as the leakage losses, a great deal of oil must be provided through the oil holes 34 to make sure that enough reaches the target area. This can be costly in terms of pump capacity. Moreover, a given pump capacity may be inadequate if it is desired to increase the relative speed between the bearing surfaces 12 and the pathway 24 during overrun. This conventional type of lubrication is generally referred to as splash lubrication, because the pressure is lost once the oil reaches cage 10.

SUMMARY OF THE INVENTION

The invention is used with the same mounting drum, pathway race, and snap ring as that described above. No additional components or extra space is required. A new clutch cage cooperates with the mounting drum and with a modified cam race to create a secondary closed oil path that connects to the primary oil path, and which takes pressurized lubricant directly to the target area.

In the preferred embodiment, the radially outer edge of the inner face of the cam race has a shallow slot cut into it. The new cage is somewhat axially wider than the known cage described above, although it fits within the same available space. A series of tabs extends inwardly from the radially inner edge of the inner face of the cage. Each tab fits closely into the cam race slot, providing a stop means that prevents the cage from sliding off of the cam race in one direction. Each tab has a radial groove molded into it that opens into a closed bottom core passage, creating an internal passage in the cage that is open only through the inner face of the cage. An oil port connects each core passage to a respective cage bearing surface.

First, the cage is installed to the cam race, which registers each cage tab groove with a respective cam race radial groove. Then, the cam race is secured to the drum by the same friction fit. This traps the cage tabs between the cam race slot and the drum face, so the cage cannot slide in either direction. Because of the wider profile of the new cage, its inner face is maintained in tight abutment with the face of the drum, which completely closes off the open side of the cage internal passage. A secondary closed oil path is thereby created that connects to the primary path. Oil leaving the primary path can now remain under pressure until it reaches the cage bearing surface-pathway interface. The new, completely pressurized oil path is more direct, since the oil does not have to go through the roller pocket or travel as great a distance to the target area. Therefore, lubrication potential is much improved for a given pump capacity.

It is, therefore, a general object of the invention to improve the lubrication of a roller clutch in a vehicle transmission during overrun without the need for additional structure or the use of any additional space.

It is another object of the invention to provide such improved lubrication by supplying the oil under pressure directly to the desired area.

It is another object of the invention to provide pressurized oil and a shortened lubricant path by forming an internal passage in the cage that is open only through the inner face of the cage, which is then tighly abutted with a mounting structure when the cam race is secured to the same mounting structure, thereby creating a closed extension of an existing primary oil path and bringing pressurized lubricant directly through the cage to the target area.

DESCRIPTION OF THE PREFERRED EMBODIMENT

Figure 4:
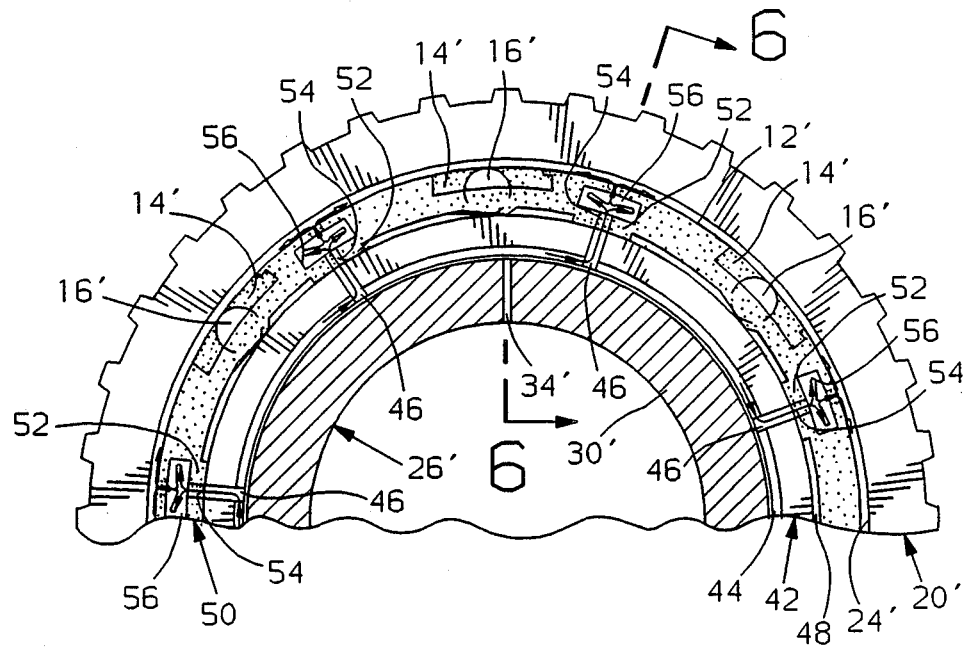
Figure 5:
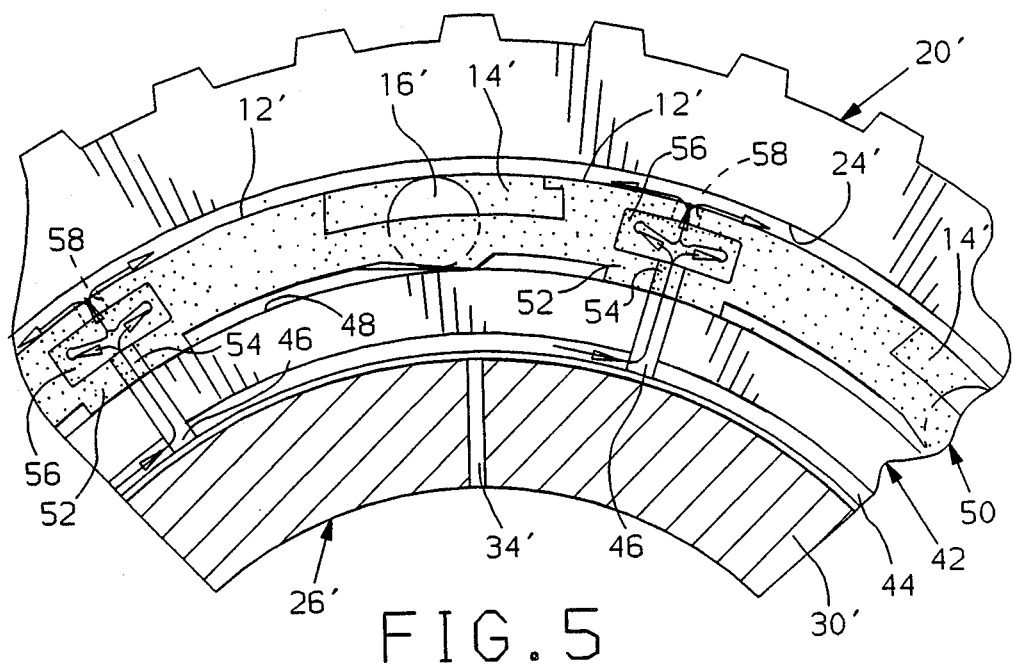
Figure 6:
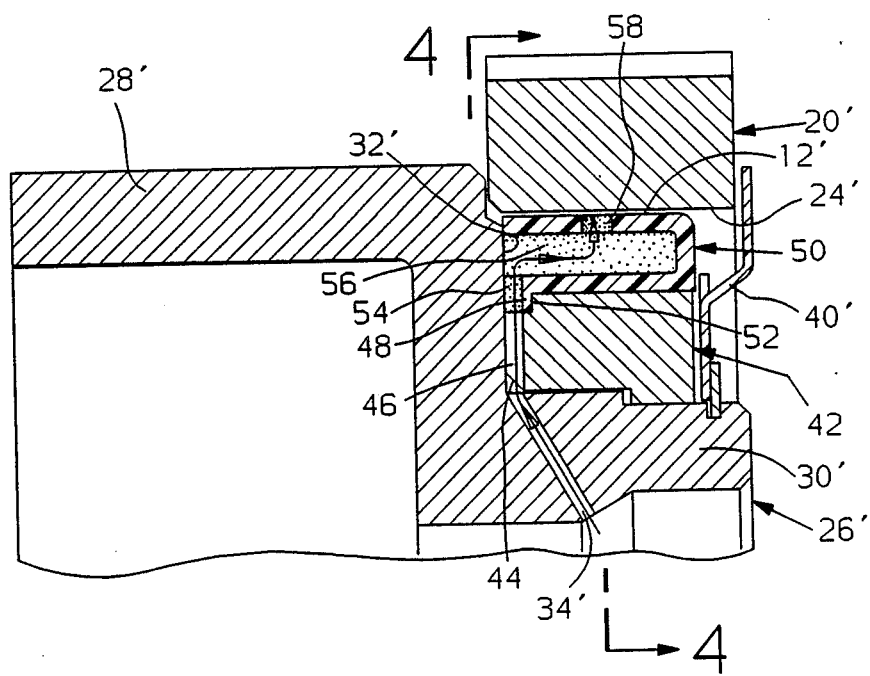

These and other objects and features of the invention will appear from the following written description, and from the drawings, in which:

FIGS. 1-3 show the prior art;

FIG. 4 is a view equivalent to FIG. 1, taken along the line 4—4 of FIG. 6;

FIG. 5 is an enlargement of a portion of FIG. 4;

FIG. 6 is a sectional view taken along the line 6—6 of FIG. 4, showing a preferred embodiment of the invention.

Referring to FIGS. 4 and 6, the same pathway race, drum and snap ring are used with the invention as in the prior art described above, and equivalent structure is indicated by the same number distinguished with a prim ('). The modified cam race used in the preferred embodiment of the invention is indicated generally at 42. Cam race 42, like cam race 18, has a chamfer 44 at the radially inner edge of its inner face and a series of radial grooves 46 cut all the way across its inner face. In addition, cam race 42 has a shallow, narrow, square cornered slot 48 cut all the way around the radially outer edge of its inner face.

Still referring to FIGS. 4 and 6, the new cage used in a preferred embodiment of the invention is indicated generally at 50. Cage 50 is integrally molded of the same material as cage 10 and fits into the same available space. Cage 50 also has the same bearing surfaces 12' and the same roller pockets 14', which retain the same spring energized rollers 16'. However, cage 50 has significant structural differences that allow it to cooperate with the modified cam race 42, and with the same drum 26', to greatly improve lubrication. Cage 50 is slightly axially wider than cage 10, and a series of short tabs 52 extend radially inwardly from its inner edge. Each tab 52 has a surface coplanar to the inner face of cage 50, and is sized to fit closely into slot 48. Each tab 52 also has a radial groove 54 molded into it's surface, which is the same width and depth as a respective cam race radial groove 46. The outer end of each tab groove 54 opens into a closed bottom core passage 56 molded into cage 50 just below each bearing surface 12'. The tab grooves 54 and core passages 56 together comprise an internal passage in cage 50 that is open on one side of cage 50, that is, open through the inner face of cage 50. Finally, an oil port 58 is molded or drilled through cage 50 connecting each core passage 56 and respective cage bearing 12'.

Referring next to FIGS. 5 and 6, it will be seen that, because of the inward extension of the tabs 52, cage 50 can be installed to cam race 42 only by sliding it on from left to right. The tabs 52 in slot 48 act as a stop means, preventing the cage 50 from moving axially to the right relative to the cam race 42. So, cage 50 has to be installed to cam race 42 before the cam race 42 can be secured to drum 26'. This forced order of assembly represents no practical difficulties or limitations, and in fact is deliberate. Other than that, cage 50 would be installed in conventional fashion, pushed axially onto cam race 42 and then twisted until it "clicked" into place. After cage 50 has been installed, it does not turn relative to cam race 42, and each tab groove 54 will be registered with a respective cam race groove 46. Then, cam race 42 is secured to the smaller drum sleeve 30', in exactly the same way that cam race 18 would be. Cage 50 now cannot move to the left, either, as seen in FIG. 6, because the tabs 52 are now trapped between the slot 48 and the drum surface 32'. With the tabs 52 held in place, the greater axial width of cage 50 assures that its inner face will tightly abut the drum face 32'. Finally, pathway race 24' and snap ring 40' are added in the same fashion as race 24 and snap ring 40 described above. Here, however, snap ring 40' only keeps pathway race 24' from sliding too far to the right, and need not touch cage 50 at all.

Still referring to FIGS. 5 and 6, the close contact of the inner face of cage 50 and drum face 32' closes off the tab grooves 54 and the core passages 56, creating a secondary closed oil path that connects to the primary oil pth described above. Therefore, during clutch overrun oil can continue in a pressurized state from the radially outer edge of the inner face of cam race 42 all the way to the target area, where it will then go to atmosphere. Not only is the oil pressurized, its path to the target area is also much more direct. As seen in FIG. 5, the oil exits each cam race radial groove 46 in line with a respective cage bearing surface 12'. From there, it can continue more or less directly, through the tab grooves 54, into the core passages 56 and out through the oil ports 58 to the bearing surfaces 12'. Both the pressurization and the shortened path to the target area represent a significant improvement in lubrication quality, which can allow increased clutch overrun speed for a given oil pump capacity. However, there are no extra structures needed or additional space occupied.

Modifications of the preferred embodiment may be made. Since the oil is pressurized, it does not rely on centrifugal force or splash, which can only move it radially outwardly. Therefore, the invention would work in a case where the cam race was the outer race and the pathway the inner race. The oil would then be fed under pressure radially inwardly to the target area, instead of outwardly. Any kind of internal oil path in the clutch cage that is open only on the face or side of that side of the cage that abuts the mounting structure will be similarly closed off when the cam race is secured to the mounting structure. Making the internal cage passage open on one side makes it much easier to form. The grooves 54 and core passages 58 are a particularly advantageous embodiment of such an internal cage passage, as their lack of undercuts along the axis of cage 50 allow them to be by pass molded along with the cage 50. Some other means could used to keep the inner face of cage 50 abutted tightly with the drum face 32', in which case the cam race 42 would not have to be modified from cam race 19 at all. For example, a portion of the snap ring 40' could be swaged in to hold the inner face of cage 50 tightly in place against the drum face 32'. In that case, the tabs 52 would not be necessary, and the cage grooves 54 could just be molded directly into the inner face of cage 50 in the same locations. However, the cooperating cam race slot 48 and cage tabs 52 are especially advantageous, since the friction fit of the cam race 42 to the drum 26' is an assembly step that is done already, and the trapping of the tabs 52 in the slot 48 and against the drum face 32' assures a secure, tight abutment. The tabs 52 are molded integrally to cage 50, requiring no more manufacturing steps, while swaging the snap ring 40' would represent an additional assembly step. More ports 58 could be cut through the cage 50, if desired, to increase the oil flow. While the ports 58 as shown would have to be drilled or molded with a separate mold insert when cage 50 was molded, they could be redesigned to have an "over-under" configuration with no undercuts, and so could be by pass molded along with the rest of cage 50, just as the grooves 54 and core passages 56 are. Therefore, it will be understood that the invention is not intended to be limited to just the preferred embodiment disclosed.

The embodiments of the invention in which an exclusive property or privilege is claimed are defined as follows:

1. In a roller clutch of the type that has a cage that is installed to a cam race and which is located between said cam race and a pathway race with a bearing surface of said cage riding on a cylindrical surface of said pathway race, and in which said cam race is secured to a mounting structure and tightly abutted with a portion of said mounting structure so that said mounting structure and abutted cam race together create a primary closed oil path that ends at an edge of said cam race, and in which pressurized oil is provided to said primary oil path as said clutch operates, an improved cage for said roller clutch, comprising,
   an internal passage in said cage that is open through one face of said cage and which registers with said primary oil path at said cam race edge when said cage is installed to said cam race,
   means maintaining said one cage face abutted with said mounting structure portion after said cam race has been secured to said mounting structure, and,
   a port connecting said cage internal passage to said cage bearing surface,
   whereby, after said cage has been installed to said cam race and said cam race has been secured to said mounting structure, said cage and mounting structure together create a secondary closed oil path that connects to said primary oil path, so that pressurized oil may be supplied directly between said cage bearing surface and said pathway race cylindrical surface.

2. In a roller clutch of the type that has a cage that is installed to a cam race and which is located between said cam race and a pathway race with a bearing surface of said cage riding on a cylindrical surface of said pathway race, and in which said cam race is secured to a mounting structure and tightly abutted with a portion of said mounting structure so that said mounting structure and abutted cam race together create a primary closed oil path that ends at an edge of said cam race, and in which pressurized oil is provided to said primary oil path as said clutch operates, an improved cage for said roller clutch, comprising,
   an internal passage is said cage that is open through one face of said cage and which registers with said primary oil path at said cam race edge when said cage is installed to said cam race, stop means on said cage engageable between said cam race and mounting structure to maintain said one cage face abutted with said mounting structure portion after said cam race has been secured to said mounting structure, and, a port connecting said cage internal passage to said cage bearing surface, whereby, after said cage has been installed to said cam race and said cam race has been secured to said mounting structure, said cage and mounting structure together create a secondary closed oil path that connects to said primary oil path, so that pressurized oil may be supplied directly between said cage bearing surface and said pathway race cylindrical surface.

3. In a roller clutch of the type that has a cage that is installed to a cam race and which is located between said cam race and a pathway race with a bearing surface of said cage riding on a cylindrical surface of said pathway race, and in which said cam race is secured to a mounting structure and tightly abutted with a portion of said mounting structure so that said mounting structure and abutted cam race together create a primary closed oil path that ends at an edge of said cam race, and in which pressurized oil is provided to said primary oil path as said clutch operates, an improved cage for said roller clutch, comprising, an internal passage in said cage that is open through one face of said cage and which registers with said primary oil path at said cam race edge when said cage is installed to said cam race, a slot cut into said cam face edge, a tab on said cage that fits closely into said cam face slot when said cage is installed to said cam race, and, a port connecting said cage internal passage to said cage bearing surface, whereby, after said cage has been installed to said cam race and said cam race has been secured to said mounting structure, said tab will be trapped between said cam race slot and said mounting structure portion, thereby maintaining said cage face abutted with said mounting structue portion to create a secondary closed oil path that connects to said primary oil path, so that pressurized oil may be supplied directly between said cage bearing surface and said pathway race cylindrical surface.

* * * * *